US010934741B2

(12) United States Patent
Malins

(10) Patent No.: US 10,934,741 B2
(45) Date of Patent: Mar. 2, 2021

(54) ELECTRIC FENCE INSULATOR

(71) Applicant: Gallagher Group Limited, Hamilton (NZ)

(72) Inventor: Craig David Malins, Hamilton (NZ)

(73) Assignee: Gallagher Group Limited, Hamilton (NZ)

( * ) Notice: Subject to any disclaimer, the term of this patent is extended or adjusted under 35 U.S.C. 154(b) by 446 days.

(21) Appl. No.: 15/749,048

(22) PCT Filed: Jul. 29, 2016

(86) PCT No.: PCT/NZ2016/050122

§ 371 (c)(1),
(2) Date: Jan. 30, 2018

(87) PCT Pub. No.: WO2017/018892

PCT Pub. Date: Feb. 2, 2017

(65) Prior Publication Data

US 2018/0223560 A1 Aug. 9, 2018

(30) Foreign Application Priority Data

Jul. 30, 2015 (NZ) ........................................ 710566

(51) Int. Cl.
*E04H 17/04* (2006.01)
*E04H 17/10* (2006.01)
*H01B 17/14* (2006.01)
*A01K 3/00* (2006.01)

(52) U.S. Cl.
CPC ............. *E04H 17/10* (2013.01); *A01K 3/005* (2013.01); *E04H 17/04* (2013.01); *H01B 17/145* (2013.01)

(58) Field of Classification Search
CPC ......... E04H 17/04; E04H 17/10; E04H 17/24; H01B 17/145; H01B 17/24
See application file for complete search history.

(56) References Cited

U.S. PATENT DOCUMENTS 3,749,820 A 7/1973 Langlie et al.
4,599,488 A 7/1986 Wilson, Jr.
4,771,137 A 9/1988 Thompson
(Continued)

OTHER PUBLICATIONS

PCT, International Search Report dated Oct. 18, 2016 cited in PCT/NZ2016/050122, 3 pages.

*Primary Examiner* — Daniel J Wiley
(74) *Attorney, Agent, or Firm* — Moore & Van Allen, PLLC; Henry B. Ward, III

(57) ABSTRACT

An insulator for an electric fence having at least one wire is described. The insulator includes a body having a first end and a second end, a post connector portion at the first end of the body for connecting the insulator to a fence post, a wire attachment portion at the second end of the body, and at least one shield surrounding and extending outwardly from the body at a position away from the connector portion towards the second end, the shield including lateral portions on either side of the body. The lateral portions of the shield angle away from the second end of the body towards the first end of the body, such that when installed a straight section of the wire cannot bear against respective edges of both lateral portions simultaneously, and pass along their entire lengths, without contacting the fence post.

11 Claims, 5 Drawing Sheets

(56) References Cited

U.S. PATENT DOCUMENTS

| | | | | | |
|---|---|---|---|---|---|
| 4,845,317 | A * | 7/1989 | Wilson, Jr. | H01B 17/145 174/163 F |
| 6,380,490 | B1 * | 4/2002 | Gaston | H01B 17/145 174/158 F |
| 6,583,363 | B1 | 6/2003 | Wilson, Jr. | |
| 6,712,379 | B2 * | 3/2004 | Graham | B60D 1/00 211/18 |
| D690,265 | S * | 9/2013 | Nelson | D13/129 |
| 9,934,890 | B1 * | 4/2018 | Cruz | H01B 17/145 |
| 10,358,840 | B2 * | 7/2019 | Hiner | E04H 17/04 |
| 2014/0318828 | A1 | 10/2014 | Nelson | |

* cited by examiner

ELECTRIC FENCE INSULATOR

TECHNICAL FIELD

The present invention relates to an insulator for an electric fence.

STATEMENT OF CORRESPONDING APPLICATIONS

This application is based on the specification filed in relation to New Zealand Patent Application No. 710566, the entire contents of which are incorporated herein by reference.

BACKGROUND ART

Electric fencing is well known for use in applications such as security, whether configured to apply an electrical current to a fence line to deliver an electric shock to objects that come in contact with it, or trigger an alarm in response to detecting an intrusion attempt.

Typically, electric fences include a plurality of posts, with one or more fence lines of fencing wire passing along the posts. This wire is secured to end posts using brackets and tensioners to keep the fence lines taut, with intermediate insulators positioned on posts between the ends to keep the wires spaced.

Such intermediate insulators are required to prevent short circuiting of the wire through the post. As such, these insulators need to have sufficient creepage distance between the points of connection to the wire and fence post to prevent arcing. However, this should be balanced with keeping the overall size of the insulator compact in order to maintain sufficient clearance between adjacent insulators spaced along the post, for example to reduce the likelihood of bridging by water drops in wet conditions.

In addition to electrical performance, in security applications such intermediate insulators also need to resist attempts to breach the fence. In particular, the design of such insulators should avoid creating points on which a wire may be placed or hooked after demounting from the insulator's intended mounting point.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to an exemplary embodiment there is provided an insulator for an electric fence having at least one wire. The insulator may include a body having a first end and a second end. The insulator may include a post connector portion at the first end of the body, for connecting the insulator to a fence post. The insulator may include a wire attachment portion at the second end of the body. The insulator may include at least one shield surrounding and extending outwardly from the body at a position away from the connector portion towards the second end, the shield including lateral portions on either side of the body. The lateral portions of the shield may angle away from the second end of the body towards the first end of the body, such that when installed a straight section of the wire cannot bear against respective edges of both lateral portions simultaneously, and pass along their entire lengths, without contacting the fence post.

According to an exemplary embodiment there is provided an insulator for an electric fence having at least one wire. The insulator may include a body having a first end, a second end, and a longitudinal axis extending from the first end to the second end. The insulator may include a post connector portion at the first end of the body, including a post bearing surface facing away from the second end of the body. The insulator may include a wire attachment portion at the second end of the body. The insulator may include at least one shield surrounding and extending outwardly from the body at a position away from the connector portion towards the second end, the shield including lateral portions on either side of the body. The lateral portions of the shield may angle away from the second end, and come within at least a distance less than the diameter of the wire of the electric fence of intersecting a transverse plane located on the longitudinal axis and intersecting a portion of the post bearing surface closest to the second end of the body.

According to an exemplary embodiment there is provided an insulator for an electric fence. The insulator may include a body having a first end, a second end, and a longitudinal axis extending from the first end to the second end. The insulator may include a post connector portion at the first end of the body, including a post bearing surface facing away from the second end of the body. The insulator may include a wire attachment portion at the second end of the body. The insulator may include at least one shield surrounding and extending outwardly from the body at a position away from the connector portion towards the second end, the shield including lateral portions on either side of the body. The lateral portions of the shield may angle away from the second end, and intersect a transverse plane located on the longitudinal axis and intersecting a portion of the post bearing surface closest to the second end of the body.

It is well known in the art of electric fencing to provide fence posts sufficiently conductive that an electrical connection between the fence wire and the fence post registers as a connection to ground. This may be recognized as an alarm condition, and an alert of an intrusion attempt issued as a result.

Reference to a shield should be understood to mean a ridge extending outwardly from the body, thereby increasing the tracking distance along the surface of the insulator from the wire attachment portion to the post connector portion. Features having such functionality may also be known in the art of electric fencing as tracking fins, creepage flanges, or flashguards.

It should be appreciated that reference to the shield surrounding the body is intended to encompass embodiments in which the shield extends outwardly from a position at the second end of the body—i.e. the shield itself forms the second end of the body.

In an exemplary embodiment the insulator may include a plurality of shields, spaced apart along the longitudinal axis. It is envisaged that this may assist in increasing the creepage distance between the wire attachment portion and the insulator's point of connection to the fence post. This may be used to reduce the physical footprint of the insulator while still achieving desired performance with regard to insulation.

According to an exemplary embodiment there is provided an insulator for an electric fence having at least one wire. The insulator may include a body having a first end and a second end. The insulator may include a post connector portion at the first end of the body, for connecting the insulator to a fence post. The insulator may include a wire attachment portion at the second end of the body. The insulator may include a plurality of shields surrounding and extending outwardly from the body, spaced apart along the body between the first end and the second end. Each shield may include lateral portions on either side of the body, angling away from the second end of the body towards the first end of the body.

In an exemplary embodiment in which the insulator includes a plurality of shields, it is envisaged that the radial distance of each shield may be less than that of the next shield closer to the second end. Radial distance should be understood to mean the distance from the longitudinal axis to the outermost point of the shield, measured along a line perpendicular to the longitudinal axis.

In such an embodiment, when viewed from the second end only the first shield, closest to the second end, would be visible. This reduces the likelihood of the space between adjacent shields being used to entrap and hold the wire in a position such that an alarm condition is not detected.

Reference to a lateral portion of the shield should be understood to mean a portion of the shield extending to a side of the body, relative to the orientation of the post to which the insulator is secured. For example, where the post is upright relative to the ground, the sides of the body will be to the left and right of the longitudinal axis. Alternatively, where the post runs sideways relative to the ground, the sides of the body will be above and below the longitudinal axis.

In an exemplary embodiment, edges of the shield may be curved. It is envisaged that this may assist in reducing the likelihood of a taut wire being placed on the shield and maintaining its position without being drawn towards the fence post.

In an exemplary embodiment the edges of the shield may be curved towards a lateral plane intersecting the longitudinal axis long its length. In such an embodiment the edges of the shield, when viewed along the central longitudinal axis, slope outwardly towards the lateral plane. A taut wire either drawn down, or pulled up, to bear against the shield will slide along its edge towards the post, both by virtue of the shield extending backwards towards the post, but also the sloping of the edge towards the lateral plane.

In an exemplary embodiment the shield may be substantially in the shape of a cylindrical paraboloid with rounded corners.

Reference to a transverse plane should be understood to mean a plane dissecting the longitudinal axis through the sides of the body.

In an exemplary embodiment, the transverse plane may be substantially perpendicular with the longitudinal axis. Such a transverse plane, when intersecting the portion of the post bearing surface closest to the second end of the body, aligns with the line at which a wire running along the edges of the lateral portions of the shield may contact a post to which the insulator may be connected.

In an exemplary embodiment the transverse plane may be substantially perpendicular to the longitudinal axis in only one dimension. For example, the transverse plane may be substantially perpendicular to the longitudinal axis relative to a normal axis of the body, but non-perpendicular relative to a lateral axis of the body perpendicular to the longitudinal axis. In such an embodiment, one lateral portion of the shield may extend further than the other lateral portion, and still prevent a straight section of the wire from bearing against respective edges of both lateral portions simultaneously, and passing along their entire lengths, without contacting the fence post (i.e. reaching a point at which the wire would intersect a normal axis intersecting the portion of the post bearing surface closest to the second end of the body).

It should be appreciated that in embodiments in which there is a gap between the lateral portions of the shield and the transverse plane, the maximum value of the distance across this gap may be less than the diameter of the wire of the fence in order to ensure contact.

In an exemplary embodiment, the maximum value of the distance may be less than 4 mm. It should be appreciated that this may be dependent on the gauge wire intended for use in the fence. By way of example, commonly used wires include 1.6 mm (aluminium), and 2.5 mm (galvanized steel).

In an exemplary embodiment the lateral portions of the shield may extend beyond the transverse plane. Such an arrangement may enable any size diameter of wire to be used while ensuring contact with the fence post.

In an exemplary embodiment the post connector portion may include opposing arms with a bridging portion therebetween. In such an embodiment, the connector portion may receive at least a portion of the post between the arms to bear against an inner surface of the bridging portion—i.e. the post bearing surface facing away from the second end of the body.

In an exemplary embodiment the post connector portion may include an aperture in each arm. Such apertures may be configured to receive a fastener, passing through both arm apertures and corresponding apertures in the fence post to secure the insulator relative to the post.

The wire attachment portion may be any suitable means known to a person skilled in the art for maintaining the position of wire at an insulator—for example one or more hooks, or an aperture.

In an exemplary embodiment, at least the body and the one or more shields are manufactured as a unitary part. Other features such as the post connector portion and/or wire attachment portion may also be manufactured as a unitary part with the body and shield. However, it should be appreciated that one or more of the features of the insulator may be manufactured as a separate part and attached to the remaining features by any suitable means known in the art.

The insulator, at least the body and at least one shield, may be made of any electrically insulating material deemed to be suitable by a person skilled in the art. For example, the insulating material may be high density polyethylene (HDPE)—but this is not intended to be limiting, and other exemplary materials may include nylon, polycarbonate, polyester, polypropylene, or acrylonitrile butadiene styrene (ABS).

It should be appreciated that the dimensions of the one or more shields may be selected based on the materials used and intended application. By way of example, in an embodiment in which the insulator is made of high density polyethylene and has two shields, and intended for use with electric fences carrying voltages in excess of substantially 15000 volts, the creepage distance may be in the order of 80 mm.

According to an exemplary embodiment there is provided an insulator for an electric fence having at least one wire. The insulator may include a body having a first end and a second end. The insulator may include a post connector portion at the first end of the body, for connecting the insulator to a fence post. The insulator may include a wire attachment portion at the second end of the body. The insulator may include at least one shield surrounding and extending outwardly from the body at a position away from the connector portion towards the second end, the shield including lateral portions on either side of the body angling away from the second end of the body towards the first end of the body. The portion of the body between the shield and the post connector portion may include a guide surface sloping inwardly from the shield to an outer edge of the post connector portion.

In such an embodiment, the edges of the shield may not extend entirely back to the post connector portion, but a tensioned wire bearing against the guide surface may still slide along it into contact with the post to achieve the same result as the previously described embodiments.

In an exemplary embodiment the insulator may include at least one ridge extending along the body between the shield and the post connector portion, wherein the guide surface is located along the ridge.

In an exemplary embodiment, the insulator may include a plurality of ridges spaced apart around the body. For example, where the longitudinal axis of the insulator extends in a perpendicular orientation to an upright post, ridges may be positioned on the upper and lower sides of body; wires above and below the insulator may not be hooked onto the insulator without the tension in the wire drawing it into the post along the shield and guide surface of the ridges.

In an exemplary embodiment, the portion of the body between the shield and the post connector portion may flare outwardly along its length towards the shield.

According to an exemplary embodiment there is provided an electric fence system. The system may include at least one fence post. The system may include at least one insulator substantially as herein described, to be secured to the fence post by the post connector portion of the insulator. The system may include at least one fence line, to be supported by the wire attachment portion of the insulator.

According to an exemplary embodiment there is provided method of installing an electric fence system. The method may include securing at least one insulator, substantially as herein described, to a fence post using the post connector portion of the insulator. The method may include supporting at least wire one wire at the wire attachment portion of the insulator.

BRIEF DESCRIPTION OF THE DRAWINGS

Further aspects of the present invention will become apparent from the ensuing description which is given by way of example only and with reference to the accompanying drawings in which.

DETAILED DESCRIPTION

Figure 1A:
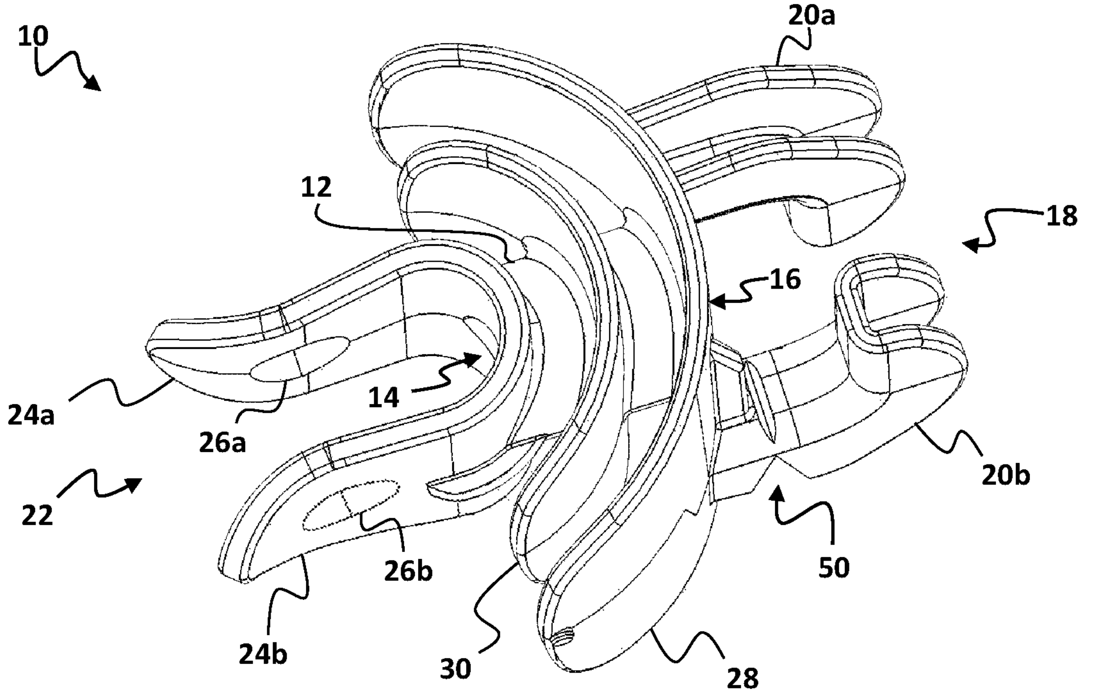
FIG. 1A is an isometric view of an exemplary insulator.

FIG. 1A illustrates an insulator 10 for an electric fence. The insulator includes a body 12, having a first end 14 and a second end 16.

A wire attachment portion 18 is located at the second end 16, including a first claw 20*a* and a second claw 20*b*, between which a wire may be placed in order to secure it relative to the insulator 10. It should be appreciated that other means for securing the wire could readily be used in place of the wire attachment portion 18.

A post connector portion 22 is located at the first end 14 of the body 12, having two opposing arms 24*a* and 24*b*. Fastener apertures 26*a* and 26*b* pass through the arms 24*a* and 24*b* respectively. Between the arms 24*a* and 24*b*, at the same location indicated by arrow 14, is a post bearing surface facing away from the second end 16 of the body 12.

The insulator 10 includes a primary shield 28, located at the second end 16 and surrounding and extending outwardly from the body 12. A secondary shield 30 is located between the first shield 28 and the first end 14. In the illustrated embodiment, the secondary shield 30 has smaller dimensions than the primary shield 28, such that it does not project beyond the primary shield when viewed from the side, or the second end 16—as seen in FIGS. 1C and 1D respectively. It should be appreciated that this is not intended to be limiting, and that in embodiments the secondary shield 30 may project beyond the primary shield 28—particularly towards the first end 14—while still achieving the functionality described in further detail below.

Figure 1B:
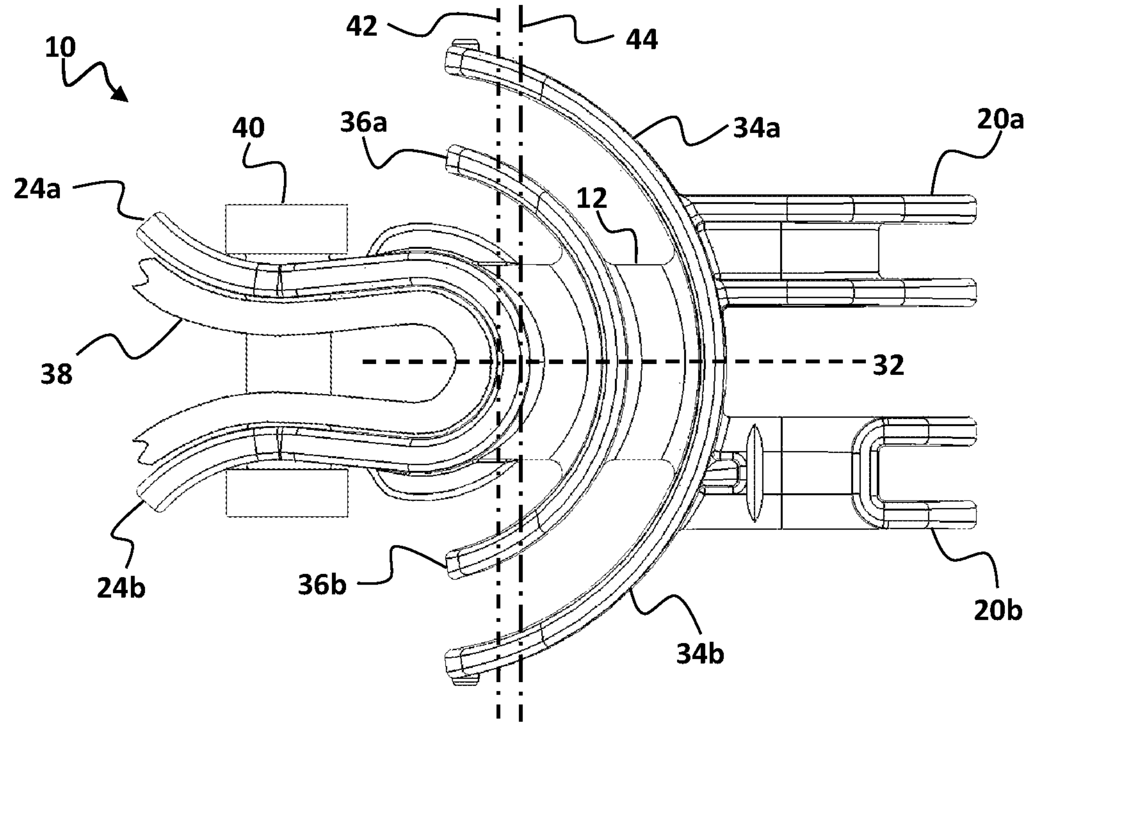
FIG. 1B is a top view of the exemplary insulator.
Figure 1C:
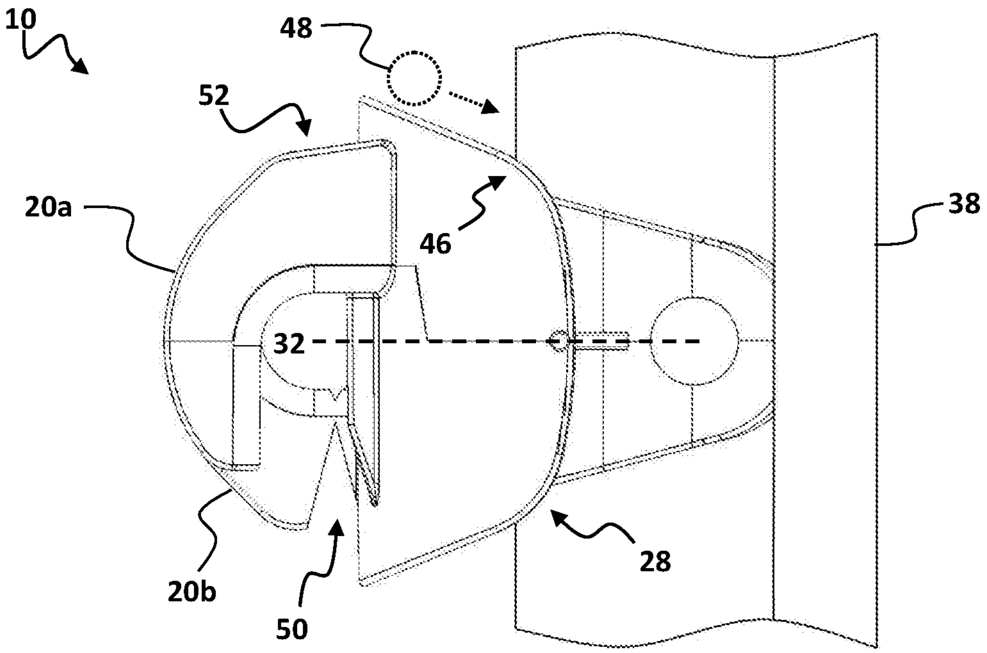
FIG. 1C is a side view of the exemplary insulator.
Figure 1D:
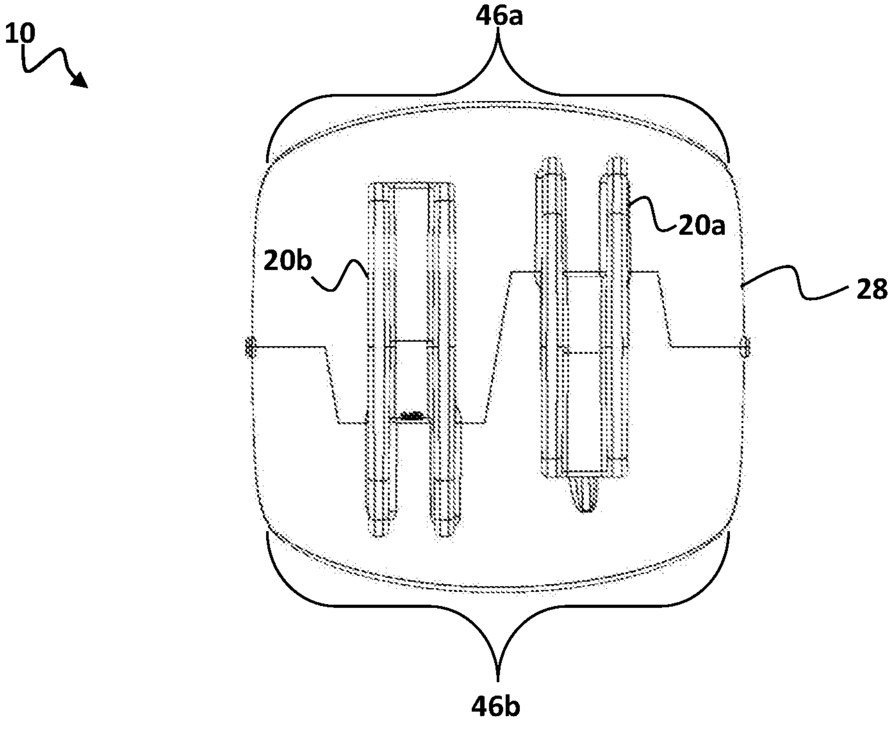
FIG. 1D is a front view of the exemplary insulator.

Referring to FIG. 1B, the body 12 includes a longitudinal axis 32, along which the first and second shields 28, 30 are located. The primary shield 28 includes first and second primary lateral portions 34*a* and 34*b* on either side of the body 12. The secondary shield 30 is similarly configured, including first and second secondary lateral portions 36*a* and 36*b*. Each of the lateral portions 34*a*, 34*b*, 36*a*, 36*b* angle away from the second end 16 towards the first end 14.

The insulator 10 may be connected to a fencepost 38, by inserting a fastener (for example, a rivet, or bolt 40 or a pin) through the apertures 26*a* and 26*b*—the apertures 26*a* and 26*b* being more clearly illustrated in FIG. 1A—of the arms 24*a* and 24*b* and corresponding apertures (not illustrated) in the post 38. The post 38 bears against the first end 14 of the body 12, and the interior of the arms 24*a* and 24*b* collectively provide a post bearing surface to maintain the orientation of the insulator 10 relative to the post 38.

A first transverse plane 42, substantially perpendicular with the longitudinal axis 32, dissects the longitudinal axis 32 and intersects the portion of the post bearing surface closest to the second end 16 of the body 12. The lateral portions 34*a*, 34*b*, 36*a*, 36*b* of the shields 28 and 30 intersect the first transverse plane 42. In doing so, a straight section of the wire cannot bear against lateral portions 34*a*, 34*b*, 36*a*, 36*b* on both sides of the longitudinal axis 32 simultaneously, and pass along their entire lengths, without contacting the fence post 38 (as will be described further below with reference to FIG. 1C).

A second transverse plane 44 is shown to demonstrate another configuration the insulator 10 could take. The second transverse plane 44 is longitudinally displaced from the first transverse plane 42 towards the second end 16. In an exemplary embodiment, the lateral portions 34*a*, 34*b*, 36*a*, 36*b* could be configured to reach the second transverse plane 44, but not extend across the gap between the first and second transverse planes 42, 44—where the gap is less than the diameter of the wire to be used in the fence.

FIG. 1C shows the overlap of the primary shield 28 with the post 38 when viewed from the side. The outer edge 46 of the primary shield 28 is curved along its length towards the longitudinal axis 32, such that a wire 48 positioned on the edge 46 will be drawn by its tension and/or by gravity in that direction, and contact the post 38.

Referring to FIG. 1D, the upper and lower portions 46*a* and 46*b* of the edge 46 is also curved to assist with this. As the edge of the shield 28 curves in a direction from the wire supporting claws 20*a* and 20*b* towards the post (post not illustrated in FIG. 1D, but see post 38 in FIG. 1B) the edge of the shield 28 is also sloped towards a lateral plane through the longitudinal axis 32. This means a wire 48 resting on top of the shield edge 46*a* will slide down the edge until resting in contact with the post. This will create a short circuit to the post, sensing of which may be registered as an alarm condition by sensing devices well known in the art, and cause an alarm to be raised.

Referring again to FIG. 1A, the secondary shield 30 is similarly shaped. The resulting shape of the primary and secondary shields 28 and 30 is substantially that of a cylindrical paraboloid with rounded corners—providing a shape which has a long creepage distance across its surfaces, while avoiding creating points on which a wire might be positioned to assist in attempting to breach the fence. It can be seen if a wire was removed from between the claws 20*a* and 20*b*, that wire could not be rested or retained between shields 28 and 30 due to the curved shape of the shields and the smaller dimensions of the secondary shield 30 compared to the primary shield 28.

Returning to FIG. 1C, the upwards facing claw 20*b* includes a structural weakness in the form of notch 50. If an attempt is made to breach the fence by climbing, the claw 20*b* will fail due to the resulting force applied by the wire—with a high likelihood of the wire subsequently touching the post 38, or an adjacent wire, to trigger an alarm.

The upper surface 52 of the downwards facing claw 20*a* is sloped downwardly towards the longitudinal axis 32, to avoid presenting a point at which a wire could be held to assist an intrusion attempt.

Figure 2A:
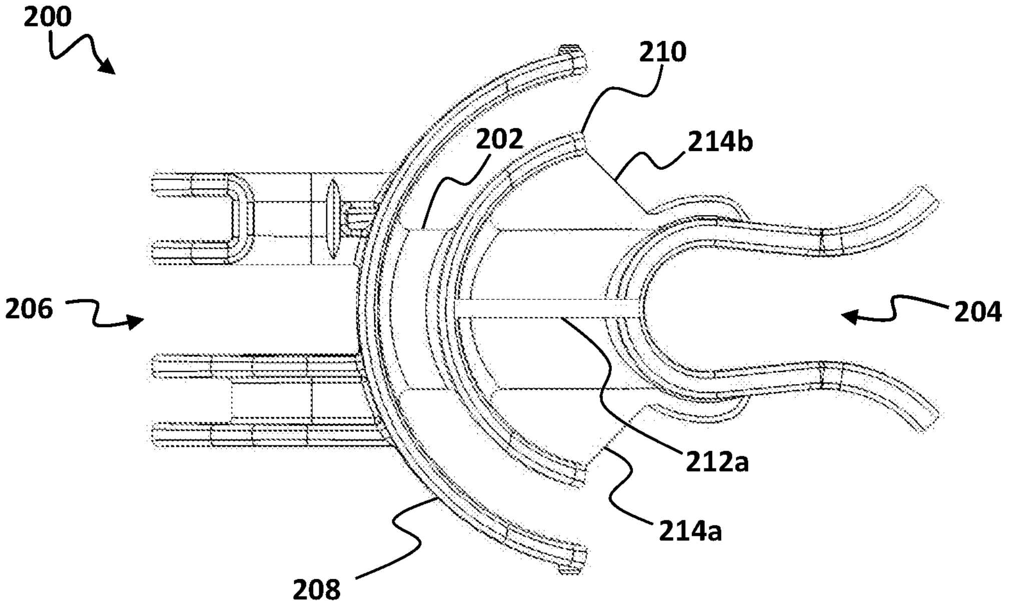
FIG. 2A is a top view of another exemplary insulator.
Figure 2B:
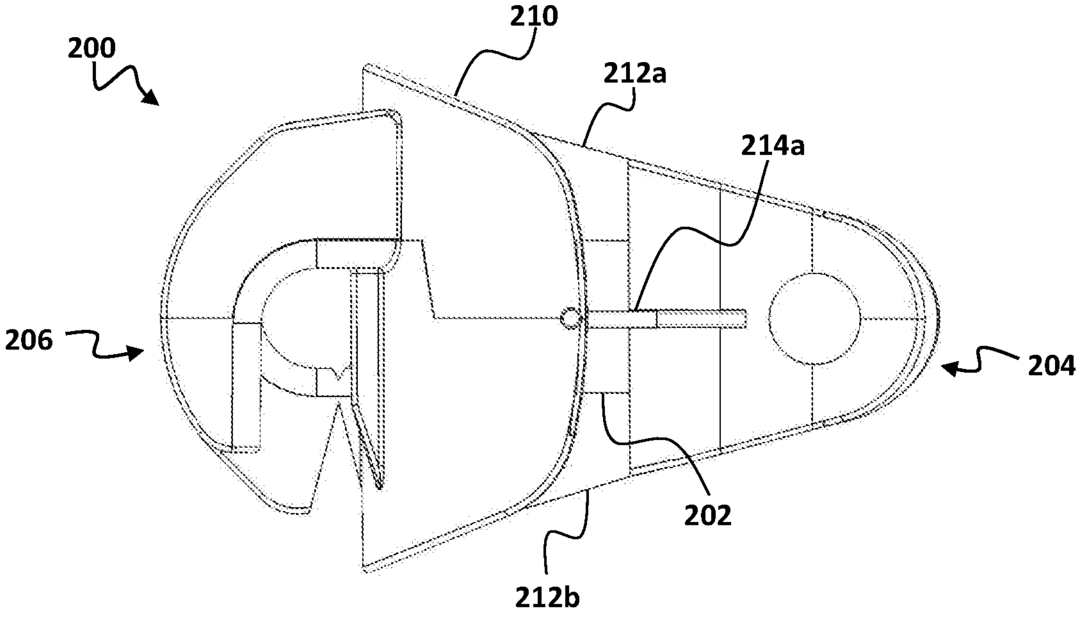
FIG. 2B is a side view of the other exemplary insulator.

FIG. 2A and FIG. 2B illustrate another insulator 200 having a body 202 with a post connector portion 204 at a first end, and a wire attachment portion 206 at a second end, with a primary shield 208 and a secondary shield 210 positioned there between. These features of the insulator 200 are generally configured in the manner described with reference to insulator 10 above, with the exception of the shields 208 and 210 not extending back as far as the post connector portion 204.

The insulator 200 includes a plurality of ridges extending between the secondary shield 210 and the post connector portion 204, sloping inwardly from the secondary shield 210: vertical ridges 212*a* and 212*b*, and horizontal ridges 214*a* and 214*b*. A tensioned wire bearing against the shields 208 or 208 will ride along the edge of the shield onto the ridges 212*a*, 212*b*, 214*a*, 214*b*, and onwards to the post secured in the post connector portion 204.

Figure 3A:
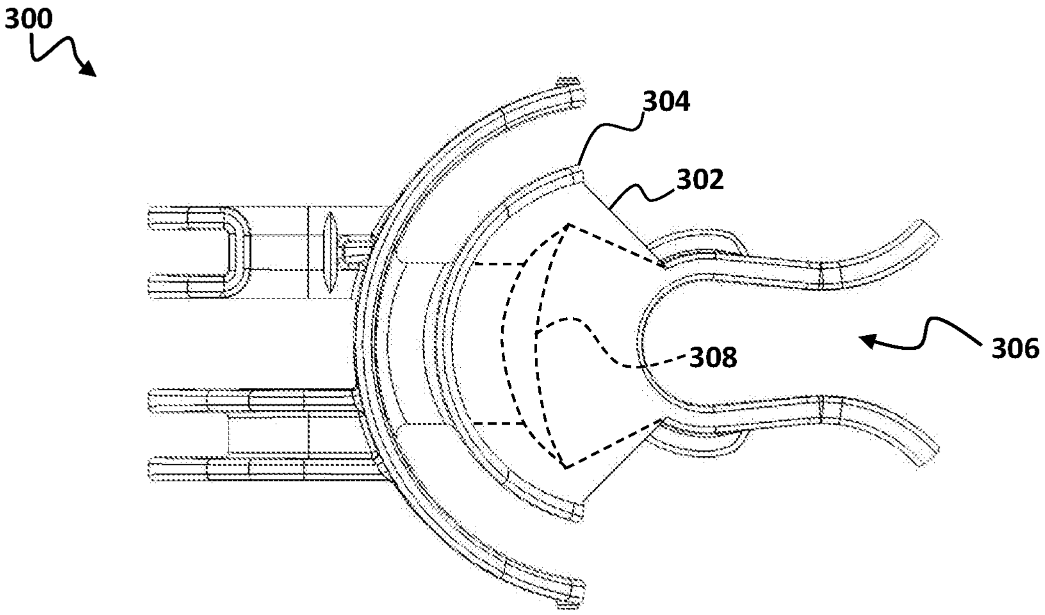
FIG. 3A is a top view of a further exemplary insulator.
Figure 3B:
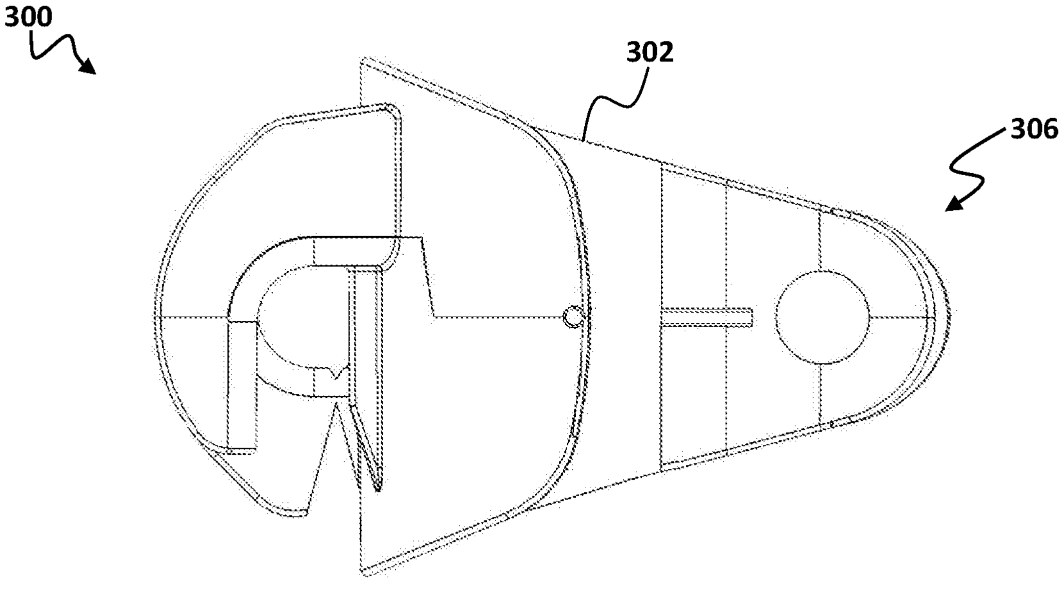
FIG. 3B is a side view of the further exemplary insulator.

FIG. 3A and FIG. 3B illustrate another insulator 300 of a similar configuration to insulator 200—replacing the ridges 212*a*, 212*b*, 214*a*, 214*b* by shaping the body 302 to slope from the secondary shield 304 to the post connector portion 306.

It should be appreciated that while the embodiments illustrated in FIGS. 2A, 2B, 3A, and 3B depict the guide surface as extending to the periphery of the secondary shield, this is not intended to be limiting. In alternative embodiments, the outermost point on the guide surface may be closer to the longitudinal axis of the body than the periphery of the shield.

Also, in exemplary embodiments the guide surface, or at least the inwardly sloping portion towards the post connector portion, may not extend the entire distance from the post connector portion to the shield. Rather, the guide surface may only extend as far as the reach of the shield—i.e. bridging the gap between the point at which the shield ends and the post connector portion. An exemplary embodiment of such an arrangement is illustrated in dashed relief 308 in FIG. 3A.

Figure 4:
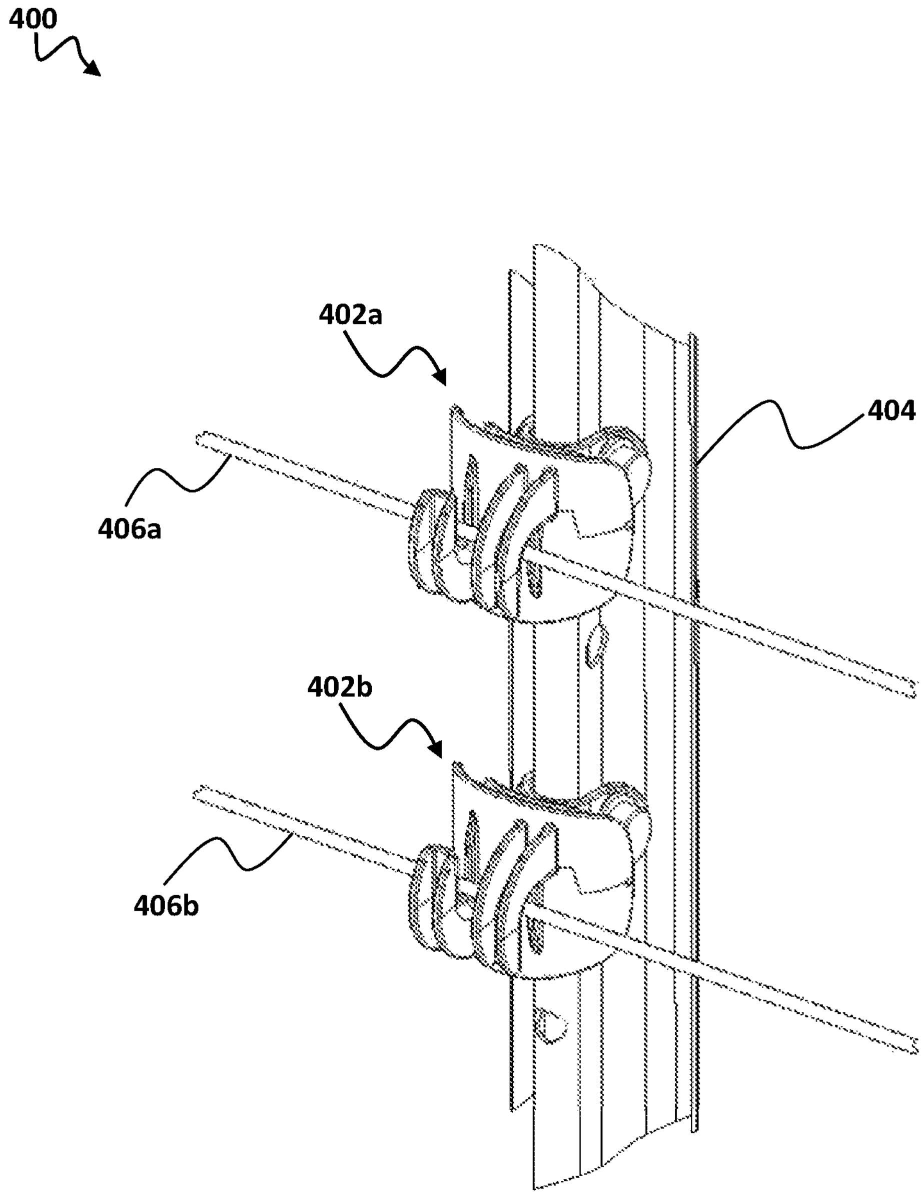
FIG. 4 is a perspective view of a section of an exemplary fence system.

FIG. 4 illustrates a portion of a fencing system 400, in which first and second insulators 402*a* and 402*b* (generally configured in the manner of insulator 10 as previously described) are secured to post 404 in a spaced relationship. A first wire 406*a* is secured by the first insulator 402*a*, and a second wire 406*b* by the second insulator 402*b*.

The configuration of the insulators 402*a* and 402*b* (discussed in greater detail with reference to insulator 10 of FIG. 1A to 1D) accounts for a range of scenarios in which either of the wires 406*a* and/or 406*b* may be released and attempt made to hold them in place using the insulators 402*a* or 402*b*, for example: pulling the first wire 406*a* down to hook under the first insulator 402*a*, or further to the second insulator 402*b*; pulling the first wire 406*a* up to hook over the first insulator 402*a*; pulling the second wire 406*b* up to hook over the second insulator 402*b*, or further to the first insulator 402*a*; or pulling the second wire 406*b* down to hook under the second insulator 402*b*.

In each of these cases, the tension in the respective wires 406*a* and 406*b* will lead them to slide along the insulators 402*a* and 402*b* into contact with the post 404.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof as defined in the appended claims.

The invention claimed is:

1. An insulator for an electric fence having at least one wire, including:

a body having a first end and a second end;

a post connector portion at the first end of the body, for connecting the insulator to a fence post;

a wire attachment portion at the second end of the body; and a plurality of substantially parallel arcuate shields, each of the shields surrounding and extending outwardly from the body at a position away from the post connector portion towards the second end, each of the shields including lateral portions on either side of the body, wherein the lateral portions of each of the shields are angled away from the second end of the body towards the first end of the body, such that when installed a straight section of the wire cannot bear against respective edges of both lateral portions simultaneously, and pass along their entire lengths, without contacting the fence post.

2. An insulator as claimed in claim 1, wherein:

the post connector portion includes a post bearing surface facing away from the second end of the body; and the lateral portions of at least one of the shields come within at least a distance less than the diameter of the wire of the electric fence of intersecting a transverse plane located on a longitudinal axis of the body and intersecting a portion of the post bearing surface closest to the second end of the body.

3. An insulator as claimed in claim 2, wherein the transverse plane is substantially perpendicular with the longitudinal axis.

4. An insulator as claimed in claim 2, wherein the transverse plane is substantially perpendicular to the longitudinal axis in only one dimension.

5. An insulator as claimed in claim 2, wherein the lateral portions of at least one of the shields intersect the transverse plane.

6. An insulator as claimed in claim 1, wherein an outer edge of at least one of the shields is curved.

7. An insulator as claimed in claim 6, wherein the outer edge of at least one of the shields is curved towards a lateral plane intersecting the longitudinal axis along its length.

8. An insulator as claimed in claim 1, wherein at least one of the shields is substantially in the shape of a cylindrical paraboloid with rounded corners.

9. An insulator as claimed in claim 1, wherein a radial distance by which each of the shields extends outwardly from the body may be less than that of the next shield closer to the second end.

10. An electric fence system, including:

at least one fence post;

at least one insulator as claimed in claim 1;

at least one fence line, to be supported by the wire attachment portion of the insulator.

11. A method of installing an electric fence system, including the steps of:

securing at least one insulator, as claimed in claim 1, to a fence post using the post connector portion of the insulator; and supporting at least wire one wire at the wire attachment portion of the insulator.

* * * * *